H. J. PALMER.
KITCHEN UTENSIL.
APPLICATION FILED FEB. 3, 1917.
1,232,385.
Patented July 3, 1917.
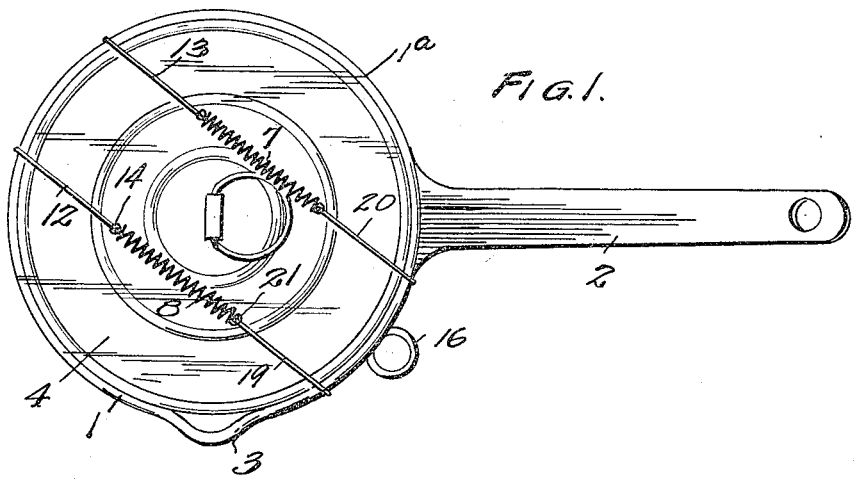
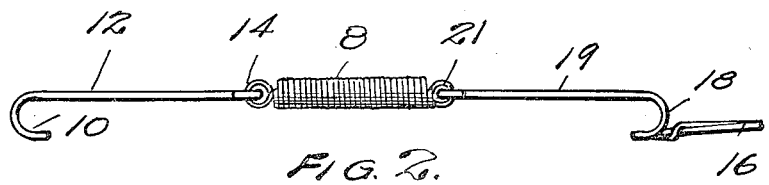
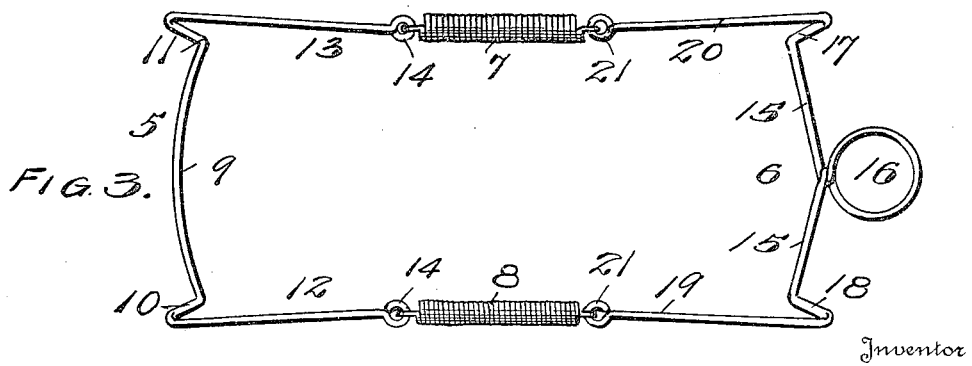
Inventor
H. J. PALMER
By Herman A. Phillipp
Attorney

UNITED STATES PATENT OFFICE.

HARRY J. PALMER, OF SUPERIOR, WISCONSIN.

KITCHEN UTENSIL.

1,232,385.   Specification of Letters Patent.   Patented July 3, 1917.

Application filed February 3, 1917. Serial No 146,329.

*To all whom it may concern:*

Be it known that I, HARRY J. PALMER, a citizen of the United States of America, residing at Superior, in the county of Douglas and State of Wisconsin, have invented certain new and useful Improvements in Kitchen Utensils, of which the following is a specification.

The present invention relates to improvements in kitchen utensils, and particularly to lid holders for domestic cooking vessels such as stewing pans and other culinary vessels having approximately flat lids.

The primary object of the invention is the provision of a device of this character that is comparatively inexpensive of production, constructed of a minimum number of parts, durable, compact, and withal efficient in performing the function for which it is intended.

The invention consists essentially in certain novel combinations and arrangements of parts as will be hereinafter specified and more particularly pointed out in the appended claim.

In the accompanying drawings I have illustrated one complete example of the physical embodiment of my invention constructed according to the best mode I have so far devised for the practical application of the principles of my invention.

Figure 1 is a top plan view of a culinary vessel with its lid held thereon by means of the device embodying my invention.

Fig. 2 is an edge, or side view of the device detached.

Fig. 3 is a top plan view of the device.

In order to illustrate the applicability and utility of my invention, I have disclosed in the accompanying drawings, particularly Fig. 1, the manner or mode of using the lid holder, and for this purpose a stew pan 1, with its handle 2 and pouring spout 3 is depicted. The lid 4, for the stew pan, is preferably flat, or approximately so, and as usual fits neatly within the inner periphery of the rim or bead 1$^a$ of the pan. These parts are of standard make and size, and the lid holder will also be made of standard sizes to adapt it for use with different sizes of cooking or culinary vessels.

The lid holder proper comprises the two end members 5 and 6, that are U-shape and connected by a pair of springs 7 and 8. The holder is made preferably of wire of the proper size and the springs are of sufficient size and tensile strength to securely clamp the hook members 5 and 6 under the bead 1$^a$ of the pan. The hook member 5 is provided with a curved bar 9 adapted to fit under the bead 1$^a$ and at the ends of the bar the bends 10 and 11 merge into the side bars 12 and 13 projecting approximately at right angles to the bar 9. The ends of the side bars 12 and 13 are bent over to form eyelets 14, 14 to which the ends of the two springs 7 8 are attached, and the bar 9 forming the hook portion of the member 5, is located below the plane of the springs.

The U-shape hook member 6 is formed with two bars 15, 15, fashioned with the ring 16 forming a centrally located handle or hand piece, and the two bends 17 and 18 join these members with the side bars 19 and 20, which are complementary to the side bars 12 and 13. By means of the eyelets 21, 21 at the ends of the side bars 19 20 they are connected to the springs 7 and 8.

The utility of the lid holder is illustrated in Fig. 1 where it will be seen that the two members 5 and 6 are hooked under the bead of the pan. In applying the device for use, the member 5 is first hooked under the bead, with the side bars and springs extending in parallelism across the lid 4. The handle 16 is grasped by the thumb and finger and a pull is applied to the device to stretch the springs and bring the hook member 6 over and beyond the bead at a point diametrically opposite the hooked end 5, and then the hook 6 is brought down and then allowed to clamp up under the bead. The un-hooking of the lid is just as simple and may be accomplished by merely pulling on handle 16 to free hook 6 and then withdrawing the device from the pan. The pan may be handled with freedom and impunity without danger of displacing the lid, and the contents may be poured from the spout 3 while the lid is retained.

What I claim is:—

In a device as described, a pair of U-shape hook members each comprising parallel side arms, the arms of one member being respectively in alinement with those of the other and formed with eyelets at their inner ends and a pair of springs connecting adjacent eyelets, the outer ends of the side bars being bent downwardly, a pair of oppositely disposed hook bars extending between the bent ends of the side bars, and said hook bars located in a plane beneath the plane of the side bars, and a handle portion formed integral with one of said hook bars.

In testimony whereof I affix my signature.

HARRY J. PALMER.